July 15, 1952  J. O. SARTO  2,603,065
POWER STEERING MECHANISM
Filed Oct. 28, 1949  2 SHEETS—SHEET 2
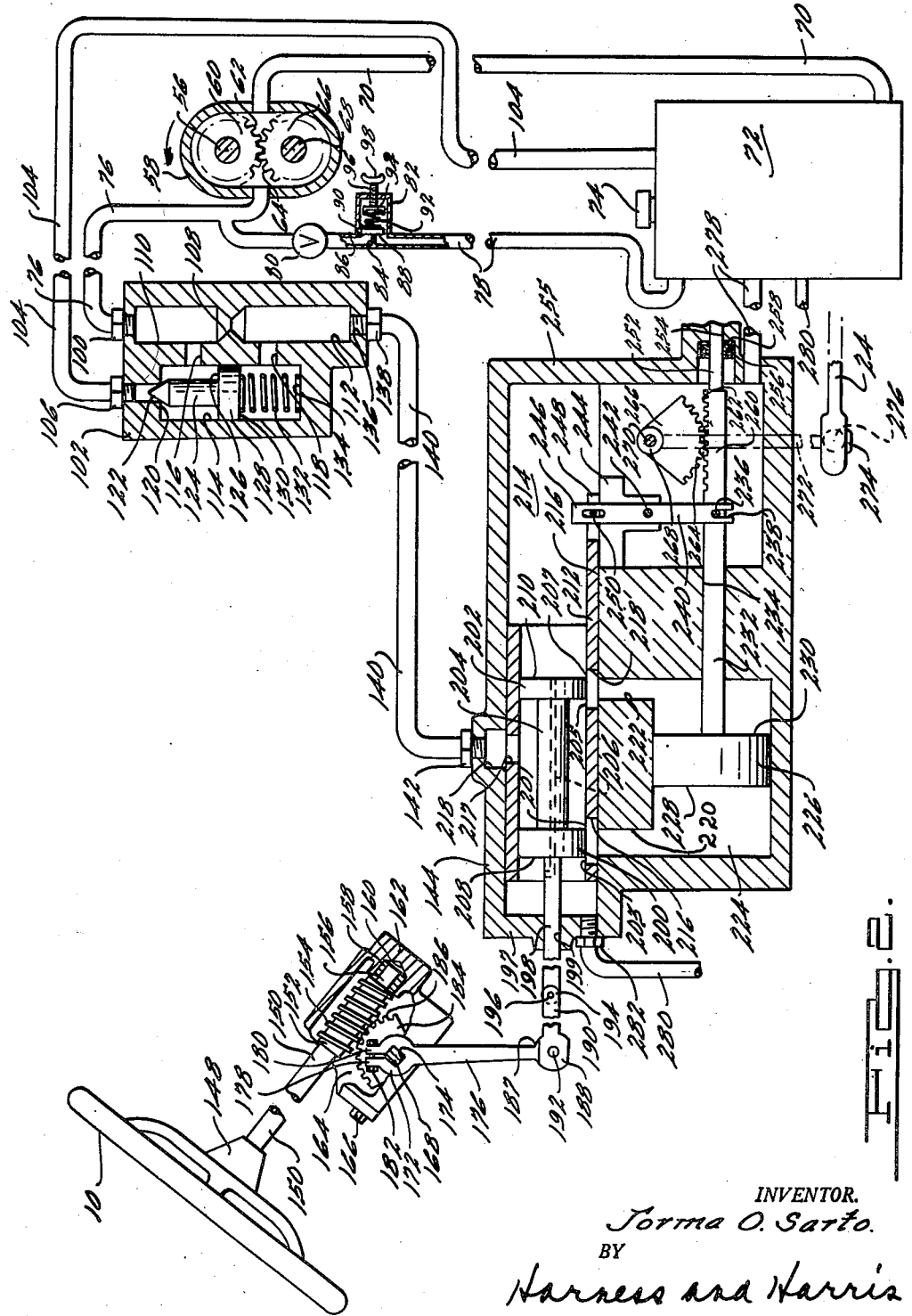
INVENTOR.
Jorma O. Sarto.
BY
Harness and Harris
ATTORNEYS.

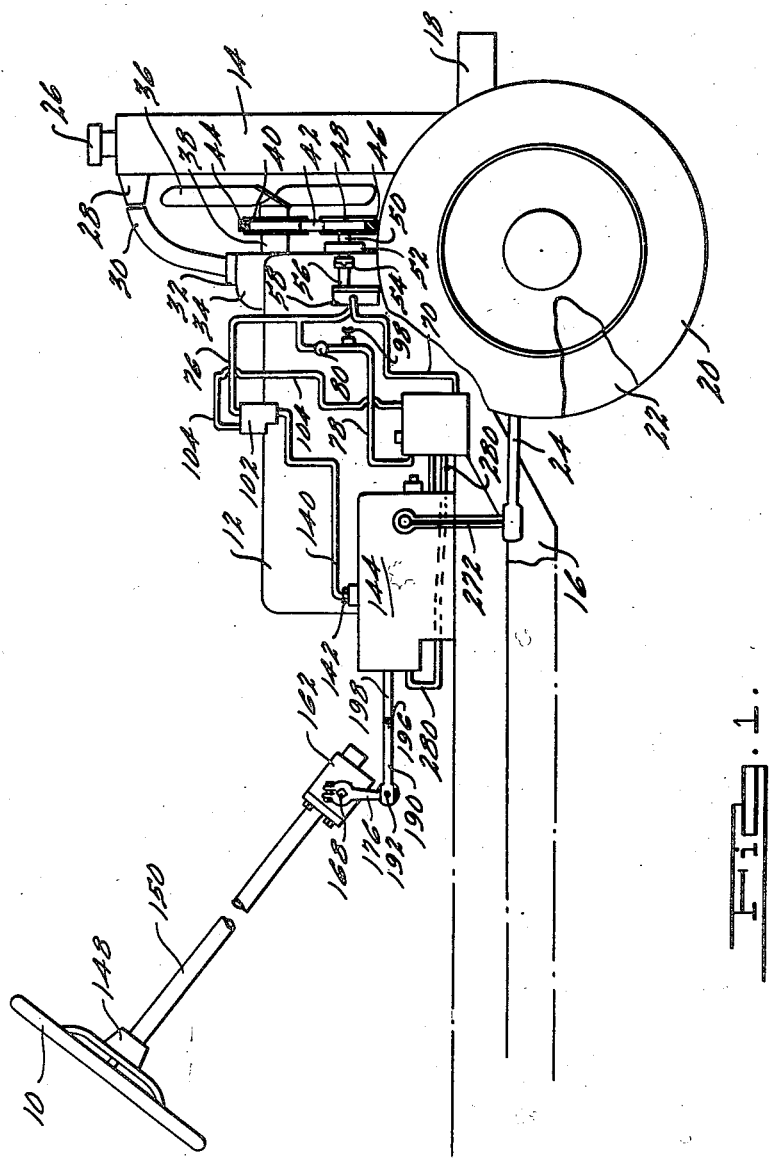

Patented July 15, 1952

2,603,065

UNITED STATES PATENT OFFICE 2,603,065

POWER STEERING MECHANISM

Jorma O. Sarto, Walled Lake, Mich., assignor to Chrysler Corporation, Highland Park, Mich., a corporation of Delaware Application October 28, 1949, Serial No. 124,006

6 Claims. (Cl. 60—52)

The present invention relates to pressure fluid apparatus and systems employed in the operation of such apparatus and more particularly to improvements in power steering mechanism by means of which vehicle wheels are power-urged to follow motion of the vehicle steering wheel and to be steeringly deflected accordingly.

Power steering mechanisms are ordinarily looked on as including means for circulating power fluid such as oil, glycerin, or the like through a series of elements including a reservoir, a power pump which draws fluid from the reservoir, and a power cylinder or motor to which fluid is delivered by the pump to actuate the steering mechanism. The power fluid from the steering mechanism is preferably returned to the reservoir for re-circulation. The steering mechanisms such as hereinafter described are preferably of the "open valve" type, that is so constructed that when the mechanism is idle there is a free passage therethrough for the power fluid such that the pump works only under a sufficient load to overcome the fluid friction of the power fluid in the pipes and passages through which each circulates. Thus practically all the energy output of the effective fluid delivered by the pump is converted into useful work of steering when steering is being done instead of being wasted in overcoming back pressure set up by a relief valve when the steering mechanism is idle. In mechanisms such as that to be described, a sensitive followup motion is effected between a sliding element connected for movement with the steering wheel and a second sliding element connected for movement with the steered part of the vehicle. These two sliding elements have a normal or a neutral relative position and when so situate, no fluid power is exerted as on the steered part ordinarily. When, however, either element is so moved that the two are not in their neutral relative position, the mechanism is so constructed that the pressure will be built up in the power fluid and exerted on the fluid motor and steered part such that one sliding element is restored to a neutral position relative to the other element.

According to one feature of the present invention there is provision of an improved means for controlling the power fluid effectively delivered to the actual steering mechanism from the pump; though the flow and pressure of the pressure fluid may fluctuate at its pumping source, the fluctuations are reduced to substantially of no effect on the steering mechanism. According to a further feature, pump horsepower is effectively conserved such that undue quantities of fluid are not needlessly circulated through the "open valve" steering mechanism; moreover, swishing and swirling noises attendant with excessive quantities of fluid circulated through the steering mechanism and its associated conduit are reduced to a minimum.

According to another feature, additional means is provided to limit the pressures in the lines attainable by fluid at any rates of flow allowed in the system regardless of the magnitude of flow and time accordingly which would be required to do damage or otherwise accomplish undesirable results as respects the system.

According to still another feature of the invention, an ordinary fixed displacement pump may be utilized to furnish motive fluid even though driven at speeds proportionate to fluctuating engine speeds.

According to still a further feature the system tends to operate relatively quietly at advanced engine and corresponding pump speeds by virtue of the improved regulating apparatus provided therefor.

These features as well as other objects and advantages will be apparent from the following description with reference being had to the accompanying drawings wherein a preferred form of embodiment of the invention is clearly shown and in which:

Figure 1 is a fragmentary elevational view of a vehicle to which the invention has been applied; and Figure 2 is a schematic diagram of the invention showing actual mechanism involved in its operation.

In the drawings a vehicle illustrative of a general type to which the invention may be applied is shown as having a steering wheel 10, a propulsion power plant 12, a radiator core 14 for cooling the power plant, and a frame 16 for supporting the power plant and having a front portion 18. Mounted by a controlled suspension, not shown, to front portion 18 of the frame may be steerable wheels 20 and 22. A link 24, the motivating force for which will be later set forth in detail, is adapted to steer a wheel of the vehicle by means of a steering knuckle, not shown. Movement of one wheel may be transmitted to the opposite wheel by conventional means of rods, further steering knuckles and the like associated therebetween. The header portion of radiator core 14 may have a filler cap 26 and an intake fitting 28 associated with a tube or hose 30. A thermostat fitting 32 is connected to hose 30 and securely mounted to the casing of a circulating water pump 34 for the power plant. A circulating fan 36 may be carried by a shaft 38 which mutually drives the impeller of pump 34. Associated with the sheave 40 of driving shaft 38 is a belt 42 powered by the engine crankshaft, not shown, and having a portion 44 wrapped in an arc around sheave 40. Another portion of the belt is indicated at 26 as being led through a sheave 48 carried by a shaft 50 journalled in a bracket 52 mounted to the engine. Shaft 52 is drivingly connected to another shaft 56 by a coupling 54 which may be of the Oldham type or may constitute a friction type clutch adapted to slip under conditions of overload. Shaft 56 in turn drives a pump 58 chosen for purposes of illustration as of the positive displacement gear type. By virtue of the fact that belt 42 is driven in correspondence with engine speeds and shaft 56 varies in its speed likewise, the pump 58 will be driven at a speed proportionate to engine speed. Drive gear 60 carried by shaft 56 has teeth 62 which may mesh with corresponding teeth 64 formed on a so-called idler pump gear 66 journalled freely in the pump casing 58 by a shaft 68. The pump intake is connected by conduit 70 to a reservoir or container 72 provided with a filler and vent cap 74. Connected with the pump outlet is a conduit 76 from which a conduit 78 leads back to container 72. Interposed in conduit 78 is a valve 80 serving suitably as a shut-off valve. Additionally located in conduit 78 is a relief valve 82 wherein is defined an opening formed by seat structure 84 and 86. A shiftable valving part 88 may be constrained in its movement at a guide location 90 such as to block in one position the valve seating opening at 84 and 86. In the eventuality of higher pressures in the valve seat opening, the shiftable valving part 88 will be tended to move in the direction of spring 92 thereby compressing it resiliently between the seat member 94 and the valving part 88. By means of a threaded stem 96 and an element 98, which may be hand operated, the preset spring force may be regulated in order to control the pressure at which valve 82 will relieve the pump outlet pressure. Conduit 76 may be provided with a fitting 100 at the regulator casing 102. A conduit 104 attached by a fitting 106 to casing 102 forms a return line to container 72. Within the regulator casing 102 an orifice is provided between an upstream passage 110 and a downstream passage 112. Adjacent these passages may be formed a chamber 114 connected upstream by communication 116 and downstream by communication 118. A valve opening 120 formed in the chamber 114 receives a valve 122 which may be of needle construction mounted on a stem 124. Exposed to upstream pressure is a surface 126 formed on a control member 128 connected for movement with valve stem 124. An opposed surface on member 128 is indicated at 130 and is exposed to pressure from the downstream side of orifice 108. It is apparent that the valve controlling member 128 may be subjected to a pressure differential against which a resilient member 132 will tend to exert an opposing force. Member 132 is adapted to act between surface 130 on valve control member 128 and a surface 134 in chamber 114. At the lower end of passage 112 on the downstream side of the orifice is a passage 136 leading to a fitting 138 having a conduit 140 associated therewith. A fitting 142 serves to connect the remote end of conduit 140 with the mechanism casing 144.

Steering wheel 10 has a hub 148 carried by a steering post or column 150. Worm member 152 on the steering column is formed with teeth 154 and has a reduced end 156 received in a suitable bearing 158 disposed in a bore 160 formed in steering gear casing 162. Casing 162 defines a cavity 164 appropriately to be supplied with a lubricant which may be introduced upon removal of closure 166 provided for the casing. A polygonal shaft 168 appropriately journalled in casing 162 has in association therewith a part 172 provided with a complementary polygonal surface 174. Part 172 constitutes one portion of an arm 176 and has a fork comprising members 178 and 180 which may adjustably be drawn together by a bolt 182 to bring the aforesaid polygonal surfaces into intimate engagement. Arm 176 and shaft 168 rotate in unison with a gear sector 184 formed with teeth 186 meshing with the teeth of worm 152. Lower portion 187 of arm 176 has associated with it a link 190 which is connected at its end 188 thereto by a pivot 192. Link 190 at its opposite end 194 is connected by pivot 196 to a valve stem 198. The valve stem is slidably received in a sealed relation through an opening 199 formed in the end wall 197 of the mechanism casing 144. Valving parts 200 and 202, mutually connected by rod 204, are moved with shift of valve stem 198. The extreme faces of valving parts 200 and 202 may be effectively connected for pressure equalization by a drilled passage 206 running for a length of the valve stem 198 and rod 204. The extreme face 208 of valving part 200 will be seen to be in adjacency with a passage 203 and the inner face of valving part 200 will be seen to adjoin a similar passage 201. The valving part 200 may be positioned variably to restrict a selected one of these passages only at the expense of variably opening the other; a similarly situated face 210 on valving part 202 may serve to restrict another passage 207. The counterpart passage for valving part 202 will be seen at 205. The valving parts just described are received in a shiftable sleeve 212 provided in the chamber 214 defined by walls 216 of casing 144. Sleeve 212 is provided with an opening 217 registering with a passage 218 leading to conduit 140. Openings 216 and 218 may be seen provided in other respective regions of sleeve 212. Communicating with the latter two openings are walls 220 and 222 providing communication into a chamber 224 occupied by a slidable piston 226. The surface 228 of the piston is exposed to pressure in the passage defined by the wall structure 220 and the face 230 of the piston is exposed to pressure existing in the passage formed by wall structure 222. A piston rod 232 serves to guide piston 226 and is received in a guide-forming structure 234 formed in casing 144. By virtue of the pin and slot connection at 236 and 238, a rotatable link 240 is connected for movement with piston rod 232. Rotation of link 240 is about its pivot 242 held firmly in a portion 244 of casing 144. The upper end 246 of link 240 may be provided with a slot in which a pin 250 carried by yoke 248 is longitudinally slidable. The yoke just described is carried for movement with sleeve 212 to the end that sleeve 212 moves in accordance with piston 226.

A reduced end 252 of the piston rod is received in an opening 254 formed in an end wall 255 of the casing for the steering mechanism. A packing element 256 is fitted around opening 254 and held there by a retainer 258. A rack segment 260 is carried by the piston rod and mounts teeth 262 enmeshed with cooperating teeth 264 formed on a gear sector 266. The gear sector 266 has a hub 268 rotatably carried in the steering mechanism casing by a rock shaft 270. An arm 272 connected for movement with gear sector 266 is provided at its depending end 274 with a connecter 276 by means of which a pivot joint is effected with link 24. In the end wall 197 of casing 144 may be provided a fitting 282 by means of which a conduit 280 constituting a return to container 72 is connected. In the opposite end wall 255 another conduit 278 is provided for effecting another return connection from casing 144 to container 72.

In operation, the steering column 150 of the steering mechanism answers to movement of the operator-controlled steering wheel 10 to rotate worm 152. If the steering wheel is turned in a direction indicative of a right hand turn of the vehicle, worm 152 tends to thrust in the direction of bearing 158 yet is generally constrained from axial movement by casing 162. If the worm is rotated in the opposite direction the axial thrust is then taken in the opposite direction as respects steering gear casing 162. By appropriate movement of the steering wheel, gear sector 184 may be caused to rotate about the axis of its rock shaft 168 and to move with it the arm 176. As arm 176 moves, accordingly moves valve stem 198 and the valve parts at either end of the valve rod 204. In neutral position valving parts 200 and 202 will tend to provide correspondingly open passages at 201 and 205 and correspondingly open passages at 203 and 207. Pressure fluid therefore, may enter the chamber 214 in the vicinity of valve rod 204 and the resulting flow will be diverted through series passages 201 and 203 and through series passages 205 and 207. The drains 278 and 280 serve to return the pressure fluid to container 72. The foregoing is a characteristic of the so-called open valve steering mechanisms. Let it be assumed that arm 176 is caused to rotate clockwise due to appropriate motion by the operator of steering wheel 10. Valving parts 200 and 202 will move to the left in the direction of casing wall 197. Passage 203 will be restricted by the face 208 of valving part 200 and at the same time passage 201 will be given a larger effective area. Accordingly, the pressure exerted against face 228 of piston 226 will increase. As valving part 200 and valving rod 204 move, the valving part 202 will in turn additionally restrict passage 205 and increase the effective area of the passage 207. A decrease in pressure will, therefore, be experienced along the face 230 of piston 226. Owing to the unbalanced forces on its faces, piston 226 will tend to move in the direction to the right toward end wall 255 of casing 144. Accordingly piston rod 232 will cause link 240 to be rotated counterclockwise and will likewise cause arm 272 to be rotated counterclockwise. Then not only do the steerable wheels of the vehicle tend to deflect in response to force exerted by link 24 but the sleeve 212 cooperating with the valving parts is shifted to the left toward end wall 197 of casing 144. It follows then that as the steerable wheels move in answer to the steering wheel, the valve sleeve 212 likewise moves with the result of restoring the normal or relatively neutral status of disposition to the valving. In the eventuality that the steerable wheels of the vehicle and the sleeve 212 should overtravel the neutral position of the valve, an opposite force differential will prevail in the piston chamber 224 and the pressure fluid will be so exerted as to bring back the sleeve and steerable wheels to neutral position.

As previously noted, pump 58 is rotated at a speed roughly proportional to engine speed. At higher engine speeds the pump will naturally tend to deliver fluid at higher rates of flow. Inasmuch as at high speeds a slight deflection of the road wheels will cause a rapid response as to turning effect on the vehicle, it is undesirable that the road wheels deflect any faster at high speeds than at ordinary low speeds of the vehicle. The regulating device 102 serves to compensate for any increase in rate of flow of fluid due to the increase of the engine speed of the vehicle and fluid pump speed. As based on a known formula for orifice flow where the volume of fluid flowing is proportional to a fractional power of the pressure differential existing across the orifice, the regulator 102 is arranged so as to be sensitive to the pressure differential across its self-imposed orifice 108. As the flow increases through the orifice 108 the pressure differential of the upstream side 110 over the lower stream side 112 becomes more pronounced and a greater unbalance of pressure forces is exerted on the faces of valve controlling member 128. Resilient element 132 may be so calibrated as to be equal and opposite to the differential pressure force exerted on valve member 128 at a predetermined flow. Since, as stated, the rate of flow through orifice 108 varies with the pressure differential taken to a fractional power, the valve stem 124 and valve 122 move substantially without regard to any one existing pressure in the system or over the entire system but are responsive merely to pressure differential and rate of flow of the fluid for all practical purposes. When the rate of flow of fluid passing from passage 110 to 112 exceeds the predetermined value then the pressure differential over the orifice will have increased in a manner which may be roughly equal to the square of the rate of flow. Then the pressure differential resulting therefrom tends to overcome the resistance of resilient spring 132 and allow pressure fluid to by-pass the pump and return to the container 72 by means of conduit 104. If the flow through orifice 108 is again increased, the further increase in the pressure differential will cause the valve 122 to offer even less of a restrictive effect in return line 104 and by-pass further of the fuel. The change of the pressure differential is sufficient over the ordinary range of flows to hold the rate of flow of fluid in downstream passage 112 to within fairly close limits. Inasmuch as the regulator 102 will ordinarily be connected adjacent pump 58 or else made integral therewith such that conduit 104 discharges directly into the inlet of the pump, there will be no substantial amount of fluid allowed to circulate in the steering mechanism system above the predetermined amount desired. Without excessive flow rates through the so-called open valve type steering mechanism, the steering operation either in the valve neutral or the valve operating position will be relatively quiet. Moreover, at high pump speeds a saving will be realized since the pump horsepower necessary to circulate in excessive quantities of fluid through the steering mechanism will never be expended in the first place.

In view of the fact that pump 58 is a positive displacement pump, it will be appreciated that at either high or low speeds thereof, a continuous amount of fluid will pass through the pump. If for some reason the steerable wheels do not respond to fluid pressure such as in the instance of the vehicle being parked against a curb so that the wheels cannot turn, the positively displaced fluid will need a means of escape in the pressure system or the pressure will tend to increase. The relief valve 82 serves to relieve the system in this contingency. Rather than having the fluid circulate at excessive pressures, the valving part 88 will be caused to unseat and to by-pass the pump fluid through conduits 78 to container 72.

It is apparent then that under conditions of excessive pressure in the system the effective rate of flow of fluid in conduit 76 to the regulator 102 is eventually limited by the relief valve 82 with pressures other than abnormal and excessive flow through orifice 108, the effective flow is limited by the regulator 102 to a predetermined maximum within reasonable limits and the excess fluid is passed through conduit 104 back to container 72. In both instances the fluid diverted from the effective flow of fluid is by-passed to reservoir. It will be recognized from the foregoing that a steering mechanism has been provided which will cause a substantial duplication of motion in the steerable wheels as respects any initiating movement in the steering wheel. The automatic regulating controls shown serve to regulate the motive fluid flowing to the steering mechanism notwithstanding variations in the character of operation of the pressure fluid supply means. In the latter regard a fixed displacement pump, which happens to be the device 58 selected for illustration, can be readily utilized even though driven at speeds variable with the speed of the engine in the vehicle.

While the form of embodiment of the invention as herein disclosed constitutes a preferred form, it is to be understood that other forms and modifications in structure might be adopted such as will readily occur to those skilled in the art but nevertheless coming within the scope of the present invention.

What is claimed is:

1. For use with a vehicle characterized by a propulsion motor and steering mechanism: in combination, a valve-controlled fluid motor having a controlled normal at-rest condition and having a controlled in-motion condition for providing power to turn the steering mechanism, the valve unit of said fluid motor being operatively arranged for receiving a continuous flow of power fluid regardless of the controlled condition being maintained aforesaid, a positive displacement pump unit driven at a speed proportional to the speed of the propulsion motor for providing power fluid to the fluid motor under said conditions and being relatively unloaded when said motor is at rest and being loaded by said motor when said motor is set in motion, and conduit structure comprising communication between said units provided with an orifice, a bypass chamber in a separated position as respects said orifice and having a discharge opening, a spaced pair of passageways communicating fluid pressures from either side of said orifice to said bypass chamber and of which one passageway is relatively adjacent said discharge opening and the other said passageway is relatively remote to said discharge opening, valving intervening in said bypass chamber between said paired passageways adjustably restricting the discharge opening adjacent said one passageway, said valving being arranged to present certain surfaces exposed to the fluid pressure from said one passageway side of the orifice and opposed surfaces exposed to the fluid pressure from the other said passageway side of the orifice, and to tend to decrease the amount of restriction in said discharge opening with increasing pressure differential across the orifice, and a fluid relief line establishing communication with said communication between said units, on the said one passageway side of the orifice.

2. In a motor-propelled vehicle having a propulsion motor, a fluid pressure system comprising a positive displacement pump part driven at a speed proportionate to the speed of the propulsion motor and having a fluid supply, power steering mechanism including a fluid motor having a valving part associated therewith for accommodating a continuous flow of motive fluid and utilizing a predetermined minimum flow therefrom for the effective operation of the said mechanism, said valving part having neutral and motor-motivating positions for causing the fluid motor to set the power steering in motion and at rest selectively while accommodating the above described continuous flow of motive fluid, fluid flow means for so connecting said parts as to deliver substantially only said predetermined minimum flow to the valving part and motor from the pump, said fluid flow means comprising flow communication between said parts, a calibrated orifice interposed in said communication, first means presenting a movable valving surface having a closed position, a bypass leading from the communication adjacent the orifice and being closed by said valving surface of said first means when the latter is in said closed position, said valving surface being movable into a position effecting the opening of said bypass, and second means associated with the first means comprising an opposed pair of actuating portions responsive one to fluid pressure upstream of said orifice and the other to fluid pressure downstream of said orifice and arranged for effecting movement of the valving surface and opening of the bypass incident to a pressure drop across the calibrated orifice indicative of attainment of said predetermined minimum flow through the communication to the valving part and accommodated by the communication when the said valving part is in any one of the neutral and motor motivating positions aforesaid.

3. In a motor-propelled vehicle having a propulsion motor, a fluid pressure system comprising a positive displacement pump part driven at a speed proportionate to the speed of the propulsion motor and having a fluid supply, power steering mechanism including a fluid motor having a valving part associated therewith for accommodating a continuous flow of motive fluid and utilizing a predetermined minimum flow therefrom for the effective operation of the said mechanism, said valving part having neutral and motor-motivating positions for causing the fluid motor to set the power steering in motion and at rest selectively while accommodating the above described continuous flow of motive fluid, fluid flow means for so connecting said parts as to deliver substantially only said predetermined minimum flow to the valving part and motor from the pump, said fluid flow means comprising flow communication between said parts, a calibrated orifice interposed in said communication, first means presenting a movable valving surface having a closed position, a bypass leading from the communication adjacent the orifice and being closed by said valving surface of said first means when the latter is in said closed position, said valving surface being movable into a position effecting the opening of said bypass, and second means associated with the first means comprising an opposed pair of actuating portions responsive one to fluid pressure upstream of said orifice and the other to fluid pressure downstream of said orifice and arranged for effecting movement of the valving surface and opening of the bypass incident to a pressure drop across the calibrated orifice indicative of attainment of said predetermined minimum flow through the communication to the valving part and accommodated by the communication when the said valving part is in any one of the neutral and motor-motivating positions aforesaid, said first and second means being movable together in paths conforming to a common axis of motion and having associated therewith resilient means continually tending to produce the bias for urging the valving surface into closed position.

4. Fluid pressure system for a steerable automotive vehicle comprising a normally unactuated fluid pressure operated steering mechanism adapted to be actuated to move loads offering varying resistance, said steering mechanism having means on the intake side thereof forming a path for pressure fluid and having control valving therefor in said path continuously permitting said fluid to flow therethrough throughout the range of failing to apply any substantial pressure to leave the mechanism at rest and causing pressure to be applied to set the mechanism in motion both when relatively loaded and when relatively unloaded, said steering mechanism being arranged for performing desirably under conditions of predetermined pressure and rate of flow in the pressure fluid path, means adapted to deliver a supply of fluid under varying pressure communicating with said fluid path, bypasses providing for return of fluid from said fluid path back to the source of fluid supply, restrictive valving adjustable with respect to the bypasses having means sensitive to characteristics of the fluid associated therewith for opening a said bypass under highly resistive loadings on the steering mechanism creating back pressures in the fluid path arising to said predetermined pressure and for independently opening another said bypass in accordance only with rates of flow in said fluid path above said predetermined rate without regard to the degree of actuation of said steering mechanism through the pressure range aforesaid.

5. In an engine-propelled vehicle having a manually controlled steering gear and a steerable road wheel, a pump-driven hydraulic steering mechanism of the open valve type for turning said steerable road wheel in response to actuation of said manually controlled steering gear and otherwise permitting said driving pump to operate against substantially no resistance, said mechanism comprising means for mechanically connecting the driving pump to the vehicle engine to provide a direct mechanical drive therebetween whereby the pump is always driven at a speed proportional to the speed of the engine, a valving-controlled steering motor driven by the pump, said valving being controlled in response to the above-described steering gear actuation and having a neutral open-valve position permitting free circulation of the pump output against no substantial opposing pressure, said pump being a positive displacement pump having a fluid flow supply path and a fluid flow discharge path for carrying the effective output thereof and communicating with the valving-controlled steering motor, bypass between the respective flow paths of the pump for accommodating excessive flow from the pump above a predetermined rate of effective output to the steering motor, and flow control means forming an adjustable restriction with respect to the bypass, said flow control means including fixed and movable parts one of which is formed to provide a pre-calibrated orifice in the pump effective output flow path, said fixed and movable parts establishing cooperation with one another to open the bypass restriction adjustably in accordance with the magnitude of pressure differential across said pre-calibrated orifice for limiting the effective output flow available to the open-valve type controlled steering motor to said predetermined rate throughout the operating range of the steering motor including the open-valve substantially unopposed condition thereof and throughout the speed range of the pump and vehicle engine.

6. In an engine-propelled vehicle having a manually controlled steering gear and a steerable road wheel, a pump-driven hydraulic steering mechanism of the open valve type for turning said steerable road wheel in response to actuation of said manually controlled steering gear and otherwise permitting said driving pump to operate against substantially no resistance, said mechanism comprising means for mechanically connecting the driving pump to the vehicle engine to provide a direct mechanical drive therebetween whereby the pump is always driven at a speed proportional to the speed of the engine, a valving-controlled steering motor driven by the pump, said valving being controlled in response to the above described steering gear actuation and having a neutral open-valve position permitting free circulation of the pump output against no substantial opposing pressure, said pump being a positive displacement pump having a fluid flow supply path and a fluid flow discharge path for carrying the effective output thereof and communicating with the valving-controlled steering motor, bypass between the respective flow paths of the pump for accommodating excessive flow from the pump above a predetermined rate of effective output to the steering motor, flow control means forming an adjustable restriction with respect to the bypass, said flow control means including fixed and movable parts one of which is formed to provide a pre-calibrated orifice in the pump effective output flow path, said fixed and movable parts establishing cooperation with one another to open the bypass restriction adjustably in accordance with the magnitude of pressure differential across said pre-calibrated orifice for limiting the effective output flow available to the open-valve type controlled steering motor to said predetermined rate throughout the operating range of the steering motor including the open-valve substantially unopposed condition thereof and throughout the speed range of the pump and vehicle engine, and a relief communication between said respective flow paths of the pump operated independently of said bypass for preventing excessive output flow pressures.

JORMA O. SARTO.

REFERENCES CITED

The following references are of record in the file of this patent:

UNITED STATES PATENTS

| Number | Name | Date |
| --- | --- | --- |
| Re. 19,515 | Bragg | Apr. 9, 1935 |
| 1,467,522 | Amsler | Sept. 11, 1923 |
| 1,914,267 | Leupold | June 13, 1933 |
| 2,102,865 | Vickers | Dec. 21, 1937 |
| 2,382,866 | Edge | Aug. 14, 1945 |
| 2,408,770 | Frische | Oct. 8, 1946 |